United States Patent Office 3,499,844
Patented Mar. 10, 1970

3,499,844
METHOD OF PREPARING AN AQUEOUS HYDROGEN PEROXIDE GEL
William H. Kibbel, Jr., Pennington, and John A. Shepherd, Princeton, N.J., assignors to FMC Corporation, New York, N.Y., a corporation of Delaware
No Drawing. Filed Aug. 21, 1967, Ser. No. 661,803
Int. Cl. A61k 27/12; B01j 13/00; C01b
U.S. Cl. 252—316
3 Claims

ABSTRACT OF THE DISCLOSURE

Stable, aqueous gels of hydrogen peroxide having a concentration of up to about 15% by weight thereof are formed by preparing a slurry of the aqueous hydrogen peroxide with a water-dispersible copolymer of acrylic acid crosslinked with about 0.75% to about 1.5% of polyallyl sucrose, and gelling the slurry by addition of a small amount of a neutralizing agent.

BACKGROUND OF THE INVENTION

Field of the invention

This invention relates to aqueous gels of hydrogen peroxide which are particularly useful in cosmetic, antiseptic and the like applications, where the physical form of the gel, and its active oxygen content, must be stable for extended periods of time.

Description of the prior art

Dilute hydrogen peroxide having a concentration of up to about 15% by weight, and preferably 1 to 12% by weight, is useful as a hair bleach, an antiseptic and the like because of its oxidizing power and its characteristic of forming harmless decomposition products. However, its use in such applications has been restricted by the fact that as it is obtained in aqueous solution it is a liquid having the consistency and viscosity of water. It has been desired to convert it to gel form, such that it might be retained at the point of application, for example in hair, or as a dressing on a wound, without running off.

Previous attempts to gel the material have resulted in either or both of causing the hydrogen peroxide to decompose unduly with loss of its active oxygen, and production of gels which are physically unstable, breaking down to a liquid on storage or handling. For example, in British Patent 827,331 it is taught that gels of hydrogen peroxide may be prepared by at least partially neutralizing an organic polymeric acid colloid in aqueous solution and adding hydrogen peroxide to the gel. Organic polymeric acid colloids stated to be useful are polyuronic acids, carboxypolymethylene compounds and polyester resins containing free carboxyl groups, e.g. partially hydrolyzed polyacrylates or polymethacrylates, polyacrylic acid, polymethacrylic acid and copolymers of unsaturated esters and acids such as the copolymers of methylmethacrylate and methacrylic acid. A commercially available member of this class is a copolymer of acrylic acid crosslinked with polyallyl sucrose, which is available as Carbopol–934.

It has been found however, that when the procedure of the British patent is followed a gelled hydrogen peroxide product results which is unstable both as to its active oxygen content and its physical form, losing a substantial amount, e.g. 10% or more of its hydrogen peroxide at ambient temperature within 7 days, and breaking down to a watery consistency within 7 days at room temperature.

SUMMARY OF THE INVENTION

We have now found that it is possible to provide aqueous gels of dilute hydrogen peroxide having a concentration of up to 15% and preferably 1 to 12%, by weight of hydrogen peroxide, utilizing a water-dispersible copolymer of acrylic acid crosslinked with about 0.75 to about 1.5% of polyallyl sucrose. A particularly useful gelling agent for our purpose is Carbopol–934, a member of this class in which the polymer of acrylic acid has been crosslinked with approximately 1% by weight of polyallyl sucrose, the latter material having an average of about 5.8 allyl groups per molecule. In our process we first mix together the aqueous hydrogen peroxide and the acrylic acid-polyallyl sucrose copolymer, the latter being employed in the amount of 0.1 to 5% of the total weight of the mixture, to form a slurry, and only then neutralize the slurry. Neutralization is effected by addition of a neutralizing agent, for example sodium hydroxide, ammonia, triethanolamine or other amine such as diisopropanol amine, monoethanol amine, triethylamine or triethanolamine which gels the copolymer and is compatible with hydrogen peroxide. The neutralizing agent is used in the amount of 0.1 to 1.5% by weight based on the amount of the copolymer. Quite surprisingly, when this procedure is followed a gel is formed which is very stable both as to its ability to retain its active oxygen content and retention of its physical form. This is quite contrary to what results from following the procedure taught in British Patent 827,331 referred to above. It is also surprising that the herein useful acrylic acid-polyallyl sucrose copolymer is effective when other generally comparable gelling agents are quite ineffective in one respect or another.

DESCRIPTION OF THE INVENTION AND THE PREFERRED EMBODIMENTS

The hydrogen peroxide employed in preparing the stable gels of our invention may be derived from any source, for example from the electrolytic process, organic processes such as the anthraquinone process or the like. The concentration of the material is that which is used in cosmetic and antiseptic applications, namely up to about 15% by weight, and preferably 1 to 12% by weight. It is apparent that in diluting the hydrogen peroxide distilled, deionized or other purified water should be used in order to avoid introduction of metal ions or other contaminants which decompose hydrogen peroxide. Likewise, stability of the hydrogen peroxide may be improved by incorporation of known stabilizers, for example phenacetin, acetanilide 8-hydroxyquinoline, the methyl ester of p-hydroxybenzoic acid or other known stabilizers in the amount of a few hundred parts per million.

The pH of the hydrogen peroxide employed is normally between 2.5 to 6, and preferably between 3.0 to 5.0. After formation of the gel, including neutralization of the gelling agent as is described below, the pH of the resulting gel is about 3.0 to 5.0.

The gelling copolymers employed by us are described in U.S. Patent 2,798,053, and are the copolymers of acrylic acid with low percentages (0.75 to 1.5%) of polyallyl sucrose, which are readily dispersible in water. The polyallyl sucrose preferably contains about 5–8 allyl groups per sucrose molecule, and can be prepared in accordance with Example 1 of the indicated U.S. patent; the copolymer can be prepared in accordance with Example 2 of the patent.

An example of a specific product so prepared is that designated by the trademark "Carbopol-934." This product is a colloidally water-soluble copolymer of acrylic acid crosslinked with approximately 1% by weight of an allyl sucrose, the latter material having an average of about 5.8 allyl groups per molecule. This product is prepared by mixing the acrylic acid monomer and the allyl sucrose in the presence of a toluene diluent and 1% of benzoyl peroxide and allowing the reaction to proceed to completion. Upon completion the diluent, together with unreacted monomer and catalyst, is removed by filtration and subsequent volatilization from the solid polymeric residue. The polymer thereby obtained is in the form of a light powder having a maximum particle size of 10 mesh and a bulk density of about 12 pounds per cubic foot. The exact molecular weight is of course unknown, but analysis shows that the product has an equivalent weight (molecular weight per repeating unit) of about 77. The minimum molecular weight, as roughly determined from viscosity measurements is probably about 200,000.

As it is used in preparing our stable gels, the copolymer is mixed in its solid form with our aqueous hydrogen peroxide. Only thereafter is the slurry which is formed neutralized by addition of 0.1 to 1.5% of a neutralizing or gelling agent, in particular those named hereinabove. The amount of neutralizing or gelling agent referred to is based on the amount of copolymer of acrylic acid and polyallyl sucrose present in the slurry. Addition of this neutralizing or gelling agent results in the formation of a gelled product having the consistency of a firm gel and thixotropic properties. It typically has a viscosity in the range of 50,000 to 750,000 cps. as measured with the Brookfield viscometer, Model RVT, #7 spindle at 2.5 r.p.m.

The gels formed in accordance with our invention are exceptionally stable. They retain their viscosity with very little loss over extended periods of time, often as much as six months or more at ambient temperature, and also are resistant to loss of active oxygen on storage. They retain essentially all of their active oxygen (e.g. 99.5%) even upon storage for as much as 2–3 months at ambient temperature, or upon accelerated testing, for example upon being held for one month at 110° F. Excellent gel stability also was observed under these accelerated test conditions. This is quite contrary to what occurs when the procedure of the British patent discussed above is followed. When that procedure is followed, the hydrogen peroxide gel initially formed has a satisfactory viscosity, but in as little as 7 days in storage at ambient temperature the gel breaks down completely to a watery consistency. Furthermore, at room temperature the active oxygen content is substantially lowered in 7 days.

The following examples are presented by way of illustration of our invention only, and are not to be considered as limiting the scope thereof in any way.

EXAMPLE 1

A ten-gallon stainless steel vessel was passivated to guard against its decomposing the hydrogen peroxide handled in this example by a standard treatment in which it was contacted with a 15% aqueous nitric acid solution overnight. After this treatment it was thoroughly rinsed with deionized water. A stainless steel stirrer was also employed in this example, and the portion of it which was to contact the materials being mixed was passivated as described above.

Fifteen thousand one hundred and forty grams of a 6.05% by weight solution of aqueous hydrogen peroxide having a pH of 4.06 was introduced into the vessel and the stainless steel stirrer, driven by a heavy-duty mixing motor, was introduced and stirring was commenced. Four hundred and fifty-four grams of Carbopol-934, a copolymer of acrylic acid crosslinked with 1% by weight of polyallyl sucrose having 5.8 allyl groups per molecule, was introduced over 5 minutes and stirring was continued for an additional 5 minutes. The pH of the resulting mixture was 2.25.

Triethanolamine was then added with continued stirring over a period of 10 minutes in an amount of 89.2 grams. The pH of the solution increased to 3.80 upon addition of all the triethanolamine, and during addition of that material the solution gelled. Mixing was continued until the gel was completely homogeneous.

The hydrogen peroxide gel which was formed by the procedure of this example had a viscosity of 560,000 cps. Its active oxygen stability was determined by storing samples of it for 27 days and 77 days, respectively, at 66° C. Its 27-day stability at 66° C. was 99.5%, and its 77-day stability at 66° C. was 98.6%. The gel stability was determined by permitting it to stand for 6 months at ambient temperature. At the end of that time the gel remained firm and exhibited no apparent change. It was also tested for gel stability by being held for 30 days at 110° F.; at the end of this 30-day test the gel also remained firm and exhibited no apparent change.

When the amount of Carbopol-934 was reduced to 150 g. in the procedure of this Example 1, the results obtained were fully as good as those achieved in the procedure of this example, with the exception that the viscosity of the gel produced when 150 g. of the Carbopol-934 was used was 92,000 cps. measured as noted above.

EXAMPLE 2 (COMPARATIVE)

An attempt was made to form a stable gel of hydrogen peroxide by first gelling water with Carbopol-934 and thereafter adding hydrogen peroxide to the gel. The procedure followed was generally that described in British Patent 827,331, referred to above.

In this example, in which equipment passivated as described in Example 1 above was used, a slurry of 8 grams of Carbopol-934 and 1000 grams of deionized water was stirred with 4 grams of an aqueous ammonia solution having a specific gravity of 0.880. To the resulting gel was then added 30 grams of 35% aqueous hydrogen peroxide.

On addition of the ammonia solution to the Carbopol-water slurry, a firm gel was formed. The aqueous hydrogen peroxide could not be mixed uniformly with the gel, as was evidenced by the fact that an analysis of a sample of the gel from the top of the mixing vessel showed it to contain 1.62% of hydrogen peroxide whereas the average hydrogen peroxide content of the mixture should have been 1.02% by weight.

On being stored at ambient temperature for 7 days the gel formed in accordance with the procedure of this Example 2 degenerated to a watery consistency. Analysis of the watery solution at the end of this test period showed it to have a hydrogen peroxide content of only 89.2%. This is a poor ambient temperature stability, particularly in as short a time as 7 days.

It therefore is seen that the procedure of this invention as demonstrated in Example 1 provides stable gels of hydrogen peroxide. These are the kind of gels which are very useful in forming cosmetic, antiseptic and the like formulations. The process of the prior art, on the other hand, is shown in comparative Example 2 to result in formation of a hydrogen peroxide gel which is quite unstable both in its retention of its active oxygen and in its ability to retain its gelled state.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art and having the benefit of this disclosure, otherwise than as specifically described and exemplified herein.

What is claimed is:

1. A method of preparing an aqueous hydrogen peroxide gel which is stable against loss of active oxygen and retains its gel form on storage, in which aqueous hydrogen peroxide having a concentration of up to 15% by weight is mixed with 0.1 to 5% of the total weight of the mixture of a water-dispersible copolymer of acrylic acid crosslinked with 0.75 to 1.5% by weight of a polyallyl sucrose having 5–8 allyl groups per molecule to form a slurry and neutralizing said slurry with 0.1 to 1.5% by weight, based on the weight of said copolymer, of a neutralizing agent which is compatible with hydrogen peroxide and gels said copolymer.

2. The method of claim 1 in which the neutralizing agent is a member from the group consisting of sodium hydroxide, ammonia, triethanolamine, diisopropanolamine, monoethanolamine and triethylamine.

3. The method of claim 1 in which the aqueous hydrogen peroxide has a concentration of 1–12% by weight and the water-dispersible copolymer of acrylic acid is crosslinked with 1% by weight of a polyallyl sucrose having an average of 5.8 allyl groups per molecule.

References Cited

UNITED STATES PATENTS 2,886,532   5/1959   Richmond et al. ____ 252—186 X

FOREIGN PATENTS 827,331   2/1960   Great Britain.

RICHARD D. LOVERING, Primary Examiner

U.S. Cl. X.R.

252—95, 102, 186; 424—62